(12) United States Patent
Schulz et al.

(10) Patent No.: US 10,408,247 B2
(45) Date of Patent: Sep. 10, 2019

(54) DEVICE FOR HOLDING A COMPONENT

(71) Applicant: A. Raymond et Cie. SCS, Grenoble (FR)

(72) Inventors: Stefan Schulz, Lörrach (DE); Marcel Lindgens, Steinen (DE); Virginie Pouzols, Huningue (FR)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 15/577,816

(22) PCT Filed: May 25, 2016

(86) PCT No.: PCT/EP2016/000864
§ 371 (c)(1),
(2) Date: Nov. 29, 2017

(87) PCT Pub. No.: WO2016/192840
PCT Pub. Date: Dec. 8, 2016

(65) Prior Publication Data
US 2018/0163756 A1  Jun. 14, 2018

(30) Foreign Application Priority Data

May 29, 2015  (DE) ........................ 10 2015 209 881

(51) Int. Cl.
| | |
|---|---|
| *F16B 2/24* | (2006.01) |
| *F16B 21/08* | (2006.01) |
| *F16B 5/12* | (2006.01) |
| *F16B 5/06* | (2006.01) |
| *F16B 37/06* | (2006.01) |

(52) U.S. Cl.
CPC .............. *F16B 2/245* (2013.01); *F16B 5/125* (2013.01); *F16B 21/086* (2013.01); *F16B 5/0635* (2013.01); *F16B 37/061* (2013.01)

(58) Field of Classification Search
CPC ...... F16B 21/086; F16B 2/245; F16B 37/061; F16B 5/0635; F16B 5/125
See application file for complete search history.

(56) References Cited

U.S. PATENT DOCUMENTS 3,217,585 A * 11/1965 Munse ................. F16B 37/044
411/432
4,262,394 A * 4/1981 Wright .................... F16B 21/02
411/349

(Continued)

FOREIGN PATENT DOCUMENTS

| WO | 2011101207 | 8/2011 |
| WO | 2012104250 | 8/2012 |

*Primary Examiner* — Robert Sandy
*Assistant Examiner* — David M Upchurch
(74) *Attorney, Agent, or Firm* — LeClairRyan

(57) ABSTRACT

The invention includes a clip, and the clip includes a head and one or more clip surfaces for contacting the component to be held or an element on which the component is to be held. The clip surface faces the head at a distance therefrom, and a clamping part is provided which supports the head from the head side facing the clip surface or is connected to the head, the clamping part having a contact surface which faces the clip surface. The invention further includes a spring which is arranged so as to pre-tension the contact surface away from the head in the direction of the clip surface.

18 Claims, 3 Drawing Sheets

(56) References Cited

U.S. PATENT DOCUMENTS

| | | | |
|---|---|---|---|
| 6,267,543 B1* | 7/2001 | David | F16B 21/02 411/549 |
| 7,207,758 B2* | 4/2007 | Leon | F16B 21/02 411/45 |
| 8,636,454 B2* | 1/2014 | Okada | F16B 5/0642 24/295 |
| 2011/0314646 A1 | 12/2011 | Ribes Marti | |
| 2013/0302087 A1* | 11/2013 | Binkert | F16B 2/243 403/345 |
| 2015/0300388 A1* | 10/2015 | Maschat | B60R 21/20 24/458 |

* cited by examiner

DEVICE FOR HOLDING A COMPONENT

TECHNICAL FIELD OF THE INVENTION

The invention relates to a device for holding a component, whereby the device comprises a clip, which comprises a head and one or more clip surfaces for a system upon which the component is to be held, or an element, upon which the component is to be held, whereby the clip surface is facing the head and is spaced away from the head.

BACKGROUND OF THE INVENTION

Screws with nuts screwed onto the grub screw of the screw are known as holding devices, which can exercise a clamping force on the component to be held or to be connected, or, alternatively, screws which can be screwed into a threaded hole. The connecting pieces that are to be attached to one another or, alternatively, to the component to be held, are arranged between the head of the screw and the nut that is screwed onto the grub screw. Screw connections do however have the disadvantage that they require a relatively time intensive attachment process. On top of this, an access must generally be made possible on both sides of the components that are to be connected, so as to have access both to the head of the screw as well as to the nut. For example, a screw must be turned multiple times, until the same is screwed deeply enough into the threaded hole. In the case of push-through screws, it is necessary to provide the pin ends, and, in the case of stud screws, frequently also the other pin ends, with a nut. In the case of a multitude of screwed-on connections, this adds enormously to the fitting time.

Furthermore, attachment device clips are known, for example, from WO 2012/104250 A1.

A clip known from WO 2012/104250 A1 exhibits a head with a head contact surface. A shaft extends from the head along a longitudinal axis. The shaft exhibits an attachment end with a contact surface that faces the head contact surface. The connection pieces that are to be connected with the holding device are arranged between the head contact surface and the contact surface of the shaft (clip surface), whereby the shaft reaches through an opening foreseen in the connection pieces or alternatively the component. In the process, it is foreseen that the clip surface is designed on a sprung element of the shaft. The spring tension pre-tensions the element in a direction away from the longitudinal axis of the shaft. This allows for the shaft of the clip to be threaded through the opening of the components, whereby in so doing the element that is spring-loaded against the spring tension moves along the longitudinal axis of the shaft and thereby the circumference of the shaft in the area of the clip is reduced. Following passage through the opening, the spring-loaded element returns to its starting position and thereby expands the circumference of the shaft. This prevents the shaft from being pulled through the opening once again. That which is a disadvantage to the known clips is that such clips cannot generate any clamping force.

A plug-in coupling for a detachable connection of a first component with a second component is known from DE 201 07 949 U1. The plug-in coupling exhibits an elastic deformable pan-like coupling section with an attachment section fixed to the first component and a ball socket that is shaped onto it and an elastic deformable ball-like coupling portion with a fastening section that is attached to the second component, a ball head that can be snapped into the ball socket and an intermediate section between the fastening section and the ball head. The ball socket of the pan-like coupling section is provided on its outer side with multiple recesses distributed in the direction of its circumference. This plug-in coupling also exhibits the disadvantage that access is required on both sides of the components that are to be held or connected.

U.S. Pat. No. 6,267,543 B1 discloses a bayonet interlock for attachment of a first plate on a second plate. The bayonet interlock comprises a screw-shaped element, that can mesh by twisting into the second plate and furthermore a plunger pin, which can mesh with the first plate, so as to ensure the screw-shaped element. The bayonet interlock known from U.S. Pat. No. 6,267,543 B1 has the disadvantage of the manipulation, which requires a precise alignment and a subsequent insertion as well as turning of the screw-shaped element. The openings that are foreseen on the first and second plates for the passing through of the screw-shaped element must be specially aligned with one another and exhibit a shape that is adjusted to the screw-shaped element. U.S. Pat. No. 4,262,394 also discloses a bayonet interlock for the attachment of two plate-shaped components.

U.S. Pat. No. 3,217,585 discloses an attachment device in the form of a cage nut, that essentially consists of a sheet steel cage. The sheet steel cage can be attachable on a carrier. The cage holds a nut in openings which are designed in parallel flanges which point upwards. There are curved sections, that are directed upwards in a curved-shaped in a plane that is set at a right-angle to the plane of the flange, which are axially arranged to the corresponding sides of the body and which protrude upwards to a height that is equal to or greater than the height of the flange. The curved sections are designed as open curves and serve the purpose as spring elements or energy storage, to achieve an elastic flexion. A further disadvantage of the attachment device known from U.S. Pat. No. 3,217,585 is likewise that one is dealing with a screw-attachment, in which an access must be ensured from both sides of the component that is to be held, so as to be able to carry out the attachment.

The invention therefore has the purpose of providing a device for holding a component that is readily manageable, with which a clamping force can be created between the components that are to be fastened or alternatively to be held.

The purpose is solved by the object of Claim 1. Advantageous embodiments are indicated in the subclaims and in the description here below.

BRIEF SUMMARY OF THE INVENTION

The invention starts with a basic idea, to foresee a contact surface by means of a further element or device part in the form of a clamping element that is arranged on a clip that is pre-tensioned in the direction of the clip surface. A component can be held between the clip surface and the clamping surface of the clamping elements. The pre-tension can thereby be used in such a manner that the component will be clamped between the clip surface and the contact surface of the clamping element and that in particular a motion of the component that is held is prevented along a middle axis of the clip, in particular along the longitudinal axis of a shaft of the clip, in relation to the clip. A device according to the invention that is fastened to a support element, that exhibits the clip and the clamping element, thereby clamps the component to be held in relation to the support element and, in particular, prevents a motion in the longitudinal direction of the shaft of the clip away from the support element.

The device for holding a component comprises a clip, that comprises a head and one or a multitude of clip surfaces for a system on the component to be held, or an element, on which the component will be held. The clip surface faces the head and is spaced apart from the head. The device furthermore comprises a clamping element that supports the head from the side of the head, that the clip surface faces or that is connected with the head. The clamping element comprises a contact surface, which faces the clip surface, and furthermore the device comprises a spring, which is arranged in such a way as to pre-tension the contact surface away from the head in the direction of the clip surface.

The term "to hold" the components comprises the suitability of the device to become connected with the component and, in particular, the suitability of the device, which can be fastened to a support element, to hold the component in relation to the support element. In reference to the device connected with the support element, the term "to hold" comprises the prevention of a movement of the component in reference to the support element in the area of the device, in particular a movement along the shaft axis of the clips of the device in the area of the device in both directions. The device can be fastened, in particular welded, with the head of the clip on a support element.

The clip can at least be partially extended through an assembly opening of the component to be held. The assembly opening can fundamentally exhibit a shape that is adapted to the outer contour of the clip, which can essentially be rectangular.

The term "component" in the sense of the invention comprises, for example, a panel or a plate for fastening on an automobile body, in particular a body panel. In the case of a component in the sense of the invention, it can also refer to a door module, a windshield-wiper module or a spare wheel module.

The term "facing" in the sense of the invention as regards two surfaces or alternatively sections of two surfaces, comprises that the surface normal of the considered surfaces, or sections of the surfaces, includes an angle that is less than 45° between one another.

The term "in the direction" in reference to a movement, in the sense of the invention, comprises a movement that is exhibited by a directional component, which is parallel to the direction. It is not necessarily so that only translational movement in this one direction is understood by the term "in the direction".

When speaking of "a spring" in the sense of the invention, one can in particular refer to an element that gives way under load and which returns to the original situation following relief of the load, which is to say that it can, in particular, behave in an elastically resettable manner. The properties of the spring can be influenced or alternatively determined by the material employed, which can preferentially be spring steel, and the geometry of the spring. The working principle can correspond to the working principle of a leaf spring of a car suspension. A spring can be installed in one of the elements, in particular the clamping element or the clip, by means of shaping or drawing in.

Insofar as the term "one" and corresponding grammatical adaptations thereof are used in relation to the gender of the element referred to in the description and the Claims, then this term is likewise applicable to the singular or plural of the respectively referred to element. The term "one" and corresponding grammatical adaptations thereof referring to the element following the term will generally also preclude the existence of multitudes of the elements.

Preferably the head is movable in relation to the contact surface through deformation of the spring in one direction, in which the pre-tension is increased. The use of a spring represents a particularly simple means to move the clamping force, which can be the means of a movement of the head in relation to the contact surfaces, which can be on the contact surfaces of the clamping element on the component to be held. The spring can be formed from spring steel, that is deflected or alternatively curved from its normal state, in such a manner that it can rebound to normal state.

The device preferably exhibits a detachable retainer that holds the head in a first position in relation to the contact surface, whereby the spring is deformed in one direction, in which the pre-tension is increased, when the head is in this position in comparison to a second position, which can accept the head in relation to the contact surface. It can hereby be enabled that the device can initially, be handled as accustomed with a clip, even if there is not a clamping force between the clip surface and the contact surfaces. The clamping element can be pre-tensioned against the clip in a movement direction along one connection axis between the clip surface and the contact surfaces, however, whereby the clip together with the clamping element can be handled in the otherwise normal manner for the clip.

In a preferable embodiment, the retainer exhibits a protrusion, which is movable from a contact position in which it contacts the head, and holds the head in the first position, to a release position in which it no longer holds the head. The retainer designed as a protrusion can maintain the pre-tension between the clamping element and the clip in the first position. The retainer designed as a protrusion can be moved into a release position, in which the pre-tension has an effect and the contact surface of the clamping element is moved away from the head in the direction of the clip surface. A retainer that is designed as a protrusion can effectively contact the clip and nonetheless be reduced to a minimum mass and volume, so as to maintain weight and costs to a minimum. Furthermore, such a retainer can simply be manufactured as a protrusion.

The clip preferably exhibits a shaft that is connected with the head, and the shaft exhibits a protrusion on the surface of which the clip surface of the clip is formed. The shaft can at least partially reach through the component to be held. The shaft can, in particular, be laid out rigidly. The shaft can at least partially extend through an opening of the component to be held. The clip surface is arranged on the shaft and can, for example, extend itself, in particular, in an angle to the shaft in the range between 45° and 135°. The clip surfaces can extend away from the shaft, whereby the protrusion on the shaft is elastically arranged in relation to the same, for example, by means of the use of a spring. The protrusion can elastically deflect in a window of the shaft, so as, for example, to reduce the scope, during the introduction of the device through an opening, of the component to be held. Following introduction through the opening of the component to be held, the protrusion can once again pull out of the window. A surface normal of the clip surface can extend, in particular, essentially parallel to the longitudinal axis of the shaft, the angle between a surface normal of the clip surface and the longitudinal axis of the shaft can preferably fall in a range between approximately 0° through 45°. In a preferred embodiment, the clamping element exhibits two springs that are spaced apart from one another, which are arranged in such a way as to pre-tension the contact surface of the head away from the direction of the clip surface. The number of elements that need to be handled can thereby be reduced, while the spring(s) is/are part of the clamping element, and that the clamping force is allowed to be distributed as homogeneously as possible, while, for example, two springs that are symmetrically arranged to a penetrating opening are foreseen on the clamping element for the clip or alternatively the shaft of the clip, so that the clamping force can be generated on the sides by means of the penetrating opening on the clamping element or by the component to be held. The holding and the clamping of the components can be improved. Symmetry of the clamping force can be generated and a tilting or tipping over of the components to be held can be avoided. A multitude of springs, in particular two, can generate a clamping force symmetry in reference to the clip or alternatively to the shaft of the clip.

The term "symmetry" or alternatively symmetrical, in the sense of the invention, can include one symmetry regarding one or a multitude of axes, or a symmetry regarding one point, whereby limited deviations from the pure geometric symmetry, which do not bring about any significant impairment of the function, should be included.

In a preferred embodiment, the clip is detachable fastened on the clamping element, so that a device is produced that is simple to handle, which does not require any complicated fastening between the clip and the clamping element that must be carried out in an additional process stage of the manufacturing of the device. The clip and clamping element can be plugged together. The clip can lay in the direction of the spring tension on top of the clamping element or alternatively butting up against the clamping element, provided that the spring is designed between the clamping element and the clip or alternatively on the clamping element. The spring tension can thereby press the clip.

It can also be foreseen that the clamping element is connected with the clip, in particular welded, preferably point-welded, so as to foresee a solid connection, which can bring about a stabilization in the movement between the clip and the clamping element. A tilting and/or tipping over of the clip in relation to the clamping element can be avoided. It is possible that the clip is connected, in particular is welded, with the clamping element in such a way that the clip is arranged in the direction of the spring tension behind the clamping element, so that the clip can be pulled upon by the spring.

It is preferred than more than one contact surface is foreseen, in order to be able to apply the clamping force in a symmetrical and homogeneous manner on the component. The multitude of contact surfaces can essentially be arranged in a symmetrical manner in reference to a part of the clamping element. In turn, the clamping element can be arranged symmetrically to the clip. It is preferred that the clamping element is arranged symmetrically to the shaft of the clip and the shaft is arranged in a penetrating opening of the clamping element. In so doing, it is possible to enable that the component is held as homogeneously as possible and that a homogeneous clamping force can be exercised on the component. The contact surface can exhibit a curved shape, whereby the contact with the component to be held can be improved.

Four contact surfaces are foreseen in a preferred embodiment, which can in particular be arranged in an essentially symmetrical manner to the penetrating opening for the shaft of the clip. Point symmetry to the focus of the penetrating opening is just a preferable as single or double axial symmetry of the one or alternatively the midline(s) of the penetrating opening.

In a preferred embodiment, the clip is produced in one piece from a metal sheet, whereby sections of the metal sheet are bent in relation to one another, so as to give the clip its three-dimensional shape and/or the clamping element is produced from one metal sheet, whereby sections of the metal sheet are bent in relation to one another, so as to give the clamping element its three-dimensional shape. The clip and/or clamping element can be produced from a metal sheet by means of a stamping and bending process. In so doing, complicated connection processes, such as, for example, welding, can be done away with, in the manufacture of the clip and/or clamping element.

The clamping element is produced from one metal sheet in a preferred embodiment, whereby sections of the metal sheet are curved in relation to one another, so as to give the clamping element its three-dimensional shape and the retainer comprises an upwardly curved portion of the metal sheet, that protrudes beyond the head of the clip, whereby the upwardly curved portion of the metal sheet exhibits a protrusion that is bent inwards, which contacts the head and holds the head in a first position. In so doing, the access to the retainer can be improved. The retainer can be detached from above in as much as it protrudes beyond the clip in height.

BRIEF DESCRIPTION OF THE SEVERAL VIEWS OF THE DRAWINGS

The invention will be further detailed on the basis of drawings which show embodiments of the invention. In the same, the figures show

DETAILED DESCRIPTION OF THE INVENTION

Figure 1:
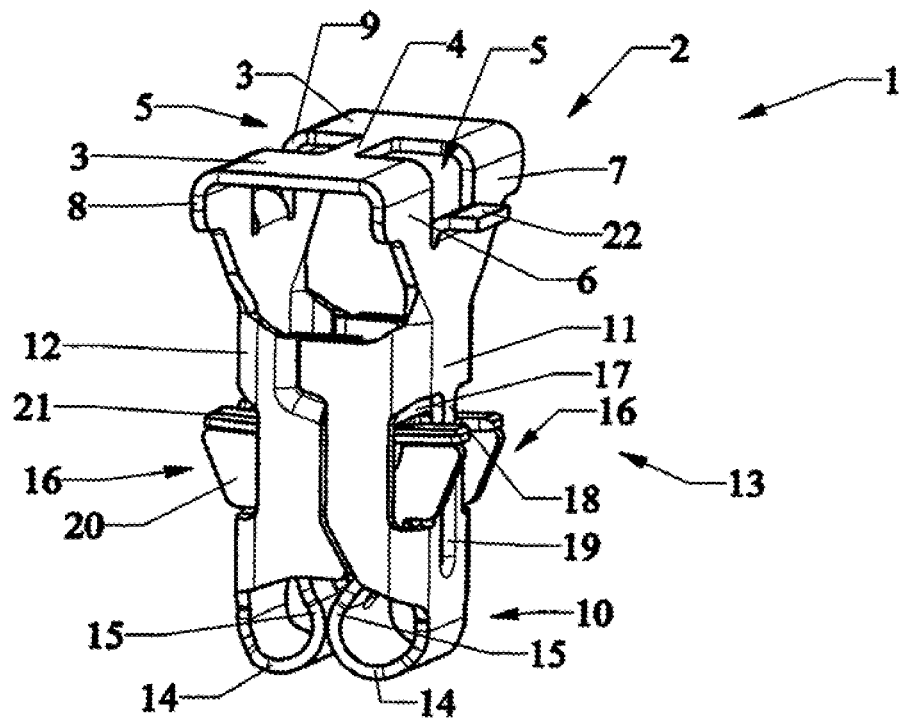
FIG. 1: an isometric representation of a clip of a device for holding a component according to a first embodiment.

FIG. 1 shows an isometric view of a clip 1 of a first embodiment example of a device for holding a component that is produced from a metal sheet by means of a stamping and bending process. The Clip 1 according to FIG. 1 exhibits two flat head cross-pieces 3, in the area of a head 2, which essentially have a rectangular form. The head cross-pieces 3 are connected by means of a connector cross piece 4. Head recesses 5 are created between the two head cross-pieces 3 and the connector cross-piece 4. Side walls 6, 7, 8, 9 are formed on the longitudinal edges of the head cross-pieces 3, which are essentially oriented rectangular to the respective head cross-piece 3. In each case, two of the side walls 6, 7 and 8, 9, together with a head cross-piece 3, form a U-shaped profile, which can lead to an elevated stiffness in the area of the head 2. A shaft arm 11, that protrudes in the direction of a foot area 10, connects with the side walls 6, 7. A shaft arm 12, that faces the shaft arm 11, that protrudes in the direction of the foot area 10, connects with the side walls 8, 9. The shaft arms 11, 12 that form a shaft 13, pass from a foot area 10, over to bending sections 14, with which each section 15 is fed back into the shaft 13. The spring specifications of the section 15 can be adjusted through the width of a bending section 14, whereby a bead in the section 15 can moreover be created for stiffening of the same.

A pair of protrusions 16 are formed onto each section 15, which, in the arrangement represented in FIG. 1, which represents a relaxed arrangement of the clips, extend outwards beyond the shaft 13 through the window 17 formed in the middle area of the shaft 13. A cross-piece 18 remains between the windows 17 of the shaft 13, in the alignment of which there is respectively a bead 19 that is formed for stiffening of the concerned shaft area. Every protrusion 16 is formed out of a side section 20 that extends laterally in the longitudinal direction of the shaft arm 11, 12 as well as being connected to the section 15 and by clip surface 21 that is essentially oriented at a right angle to the side section 20 as well with an angular deflection with the concerned side section 20. The clip surfaces 21 extend towards each other. The outer sides of the side sections 20 that are oriented outwards are beveled in the direction of the foot section 10, to permit the introduction, with relatively limited fitting force, of the shaft arms 11, 12 or alternatively of the shaft 13 by means of mounting recesses that are adjusted to their cross-section.

Figure 2:
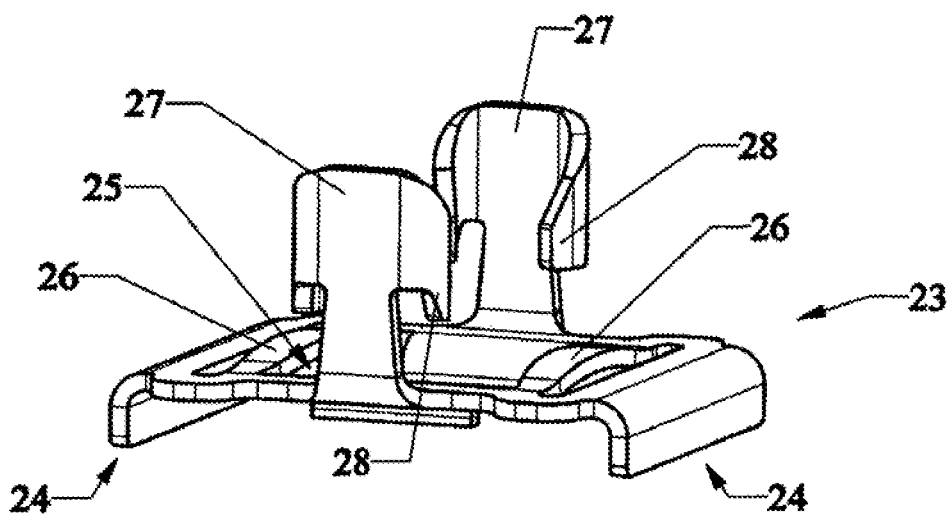
FIG. 2: an isometric representation of a clamping element of a device for holding a component according to a first embodiment.

A fixation protrusion 22 is respectively formed in the area of the head recesses 5, for the clamping element 23 represented in FIG. 2 between the side walls 6, 7 and the side walls 8, 9.

The clamping element 23, that is isometrically represented in FIG. 2, exhibits two contact surfaces 24. The contact surfaces 24 essentially extend in a straight line and parallel to one another. The contact surfaces 24 are arranged on two sides of a penetrating opening 25 for the clip 1 that oppose one another. The clamping element 23 furthermore exhibits two springs 26 which are arranged laterally to the penetrating opening 25. The springs 26 are arranged on the same sides as the contact surfaces 24. The spring tension of the springs 26 function in the direction of the direction of the penetrating opening 25. The clamping element 23 furthermore exhibits two retainers 27, which each exhibit two protrusions 28.

Figure 3:
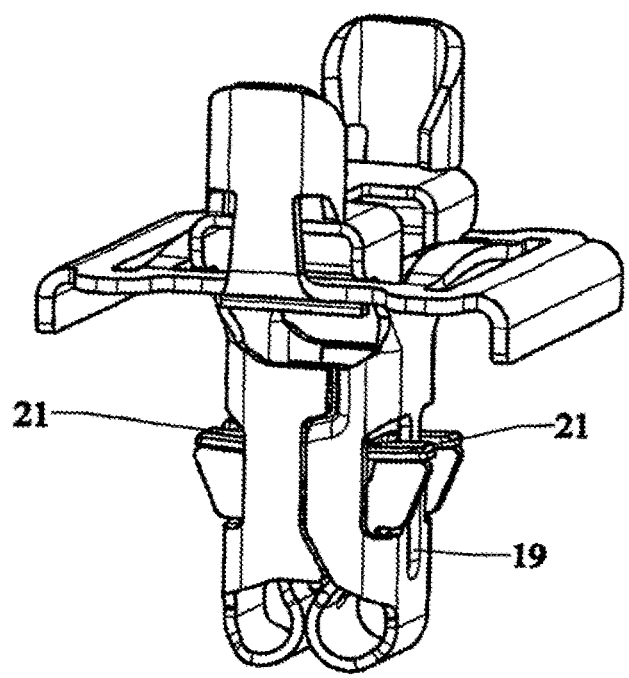
FIG. 3: the device for holding a component according to a first embodiment.

It is represented in FIG. 3 how the clip 1 is connected with the clamping element 23. The clip 1 extends itself with its shaft 13 through the penetrating opening 25 and the fixation protrusions 22 are welded with their top side to the underside of the springs 26. The protrusions 28 of the retainer 27 are engaged with the head cross-pieces 3 of the head 2 of the clip 1. The protrusions 28 apply pressure on the clip 1 against the spring tension of the spring 26 along the longitudinal axis of the shaft 13 in the direction of the foot area 10.

FIG. 3 shows the device for holding a component in a first position of the head 2 in relation to the contact surfaces 24. The head 2 is pre-tensioned in relation to the contact surfaces 24 by means of the springs 26 and the head 1 is movable in relation to the contact surfaces 24 by means of a reduction of the pre-tension (at least partially relaxation). The retainers 27, which are detachably designed, hold the head 2 in the first position (FIG. 3) in relation to the contact surfaces 24, whereby the springs 26 are deformed in a direction in which the pre-tension is increased when the head 2 is in this first position in comparison to a second, not represented, position, which can capture the head 2 in relation to the contact surfaces 24.

In the event in which the retainers 27 are brought into contact with the protrusions 28, excluding intervention, with the head 2 or alternatively the head cross-pieces 3 of the clips 1, then the retainers 27 no longer contact the head 2 and no longer hold it in the position represented in FIG. 3. The retainer 27 can be moved into its release position, in which the head 2 is moved together with the shaft 13 and the clip surfaces 21 in the direction of the contact surfaces 24, to exercise the clamping force between the clip surfaces 21 and the contact surfaces 24.

The clip surfaces 21 and the contact surfaces 24 must respectively be arranged symmetrically to the penetrating opening 25 or alternatively the shaft 13 to be able to create a symmetrical clamping force.

Figure 4:
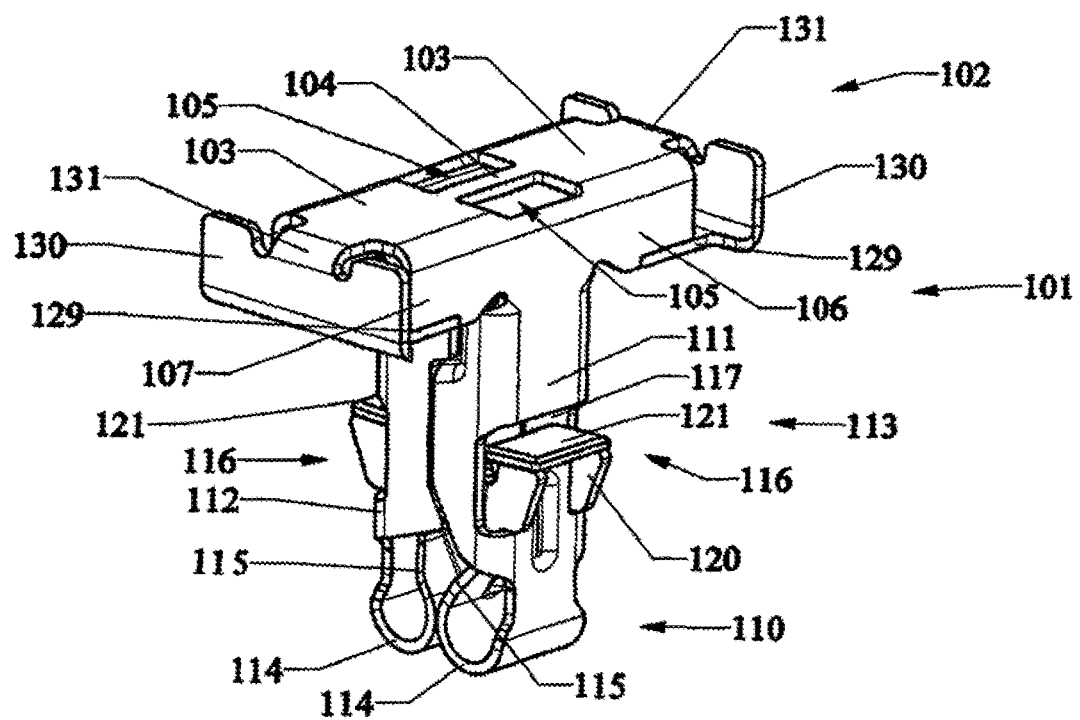
FIG. 4: an isometric representation of a clip of a device for holding a component according to a second embodiment.
Figure 5:
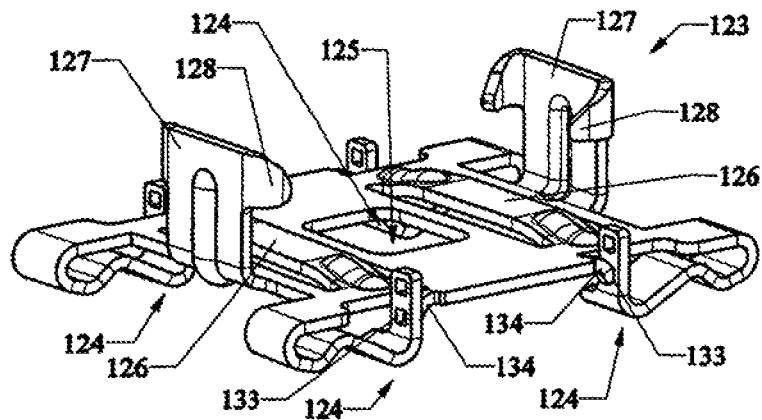
FIG. 5: an isometric representation of a clamping element of a device for holding according to a second embodiment.
Figure 6:
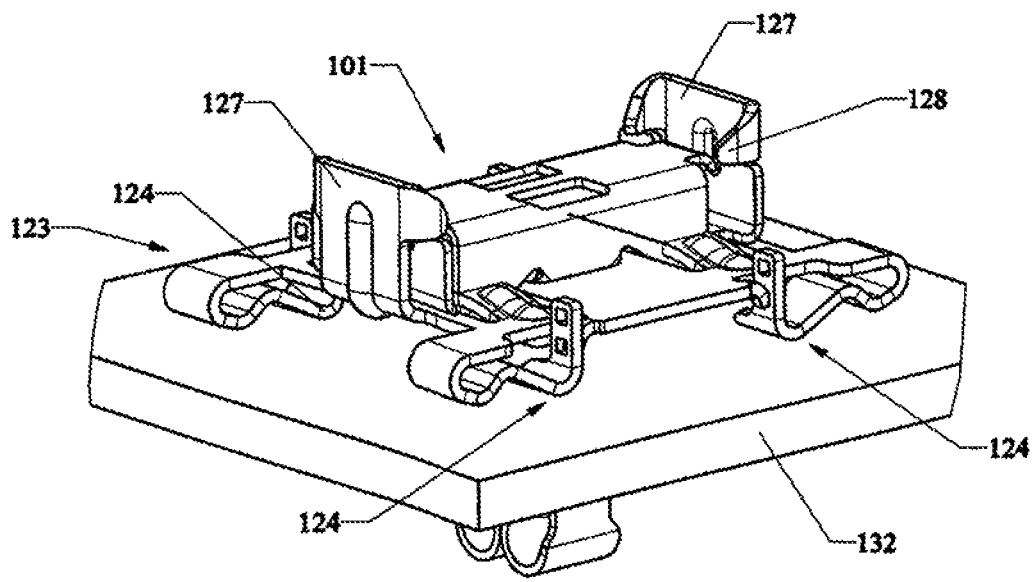
FIG. 6: the device for holding a component according to a second embodiment.

The FIGS. 4 through 6 show a further embodiment of the device according to the invention. In the case of the further embodiment, the components that are the equivalent in function to the components in the FIGS. 1 through 3 are indicated with the same reference numbers, however increased by a value of 100. Hereinafter, the second embodiment will fundamentally be described as regards its differences to the first embodiment.

As can be gathered from FIG. 4, the clip 101 of the second embodiment does not exhibit any fixation protrusions for the fastening of the clamping elements 123. Clip 101 of the second embodiment exhibits two supporting surfaces 129, which are supported by the clamping element 123 (FIG. 6). The supporting surfaces 129 extend perpendicularly to the side walls 106, 107 and face the foot area 110 of the clips 1. The supporting surfaces 129 extend up until under the u-shaped profile of the head cross-pieces 103 with the side walls 106, 107, whereby stabilization can be achieved. The support surface 129 abuts at the end of the leg of the u-shaped profile. The support surfaces 129 are respectively connected by means of a support side wall 130 and an angular deflection cross-piece 131 with the head cross-pieces 103. The support surface 129 exhibits a bend of approximately 90° to the support side wall 130. The angular deflection cross-piece 131 between the head cross-piece 103 and the support side wall 130 is curved in such a manner that an angle of approximately 90° exists between the head cross-piece 103 and the support side wall 130.

The protrusions 116 on the side of one of the shaft arms 111, 112 are connected with their clip surface 121. Enlarged windows 117 result which are formed in the shaft arms 111, 112 and which do not exhibit the middle cross-piece of the first embodiment.

The clamping element 123 that is isometrically represented in FIG. 5 exhibits two springs 126, upon which the support surfaces 129 are at least partially supported. The retainers 127 hold the clip 101 by means of an insertion of the protrusion 128 on the support side walls 130 under pre-tension (cf. FIG. 6). The retainer 127 features a retainer pin for stabilization of the retainer 127 between the protrusions 128.

The clamping element 123 exhibits four contact surfaces 124 that are curved and the curve radius of which extends obliquely to the surface normal of the components 132 that are to be held (cf. FIG. 6) and obliquely to the longitudinal axis of the shaft 113 of the clip 101. The four contact surfaces 124 are laid out symmetrically to the clamping element 123 and to the device in reference to the longitudinal axis of the shaft 113. The contact surfaces 124 are bent on one end in a direction that is approximately parallel to the longitudinal axis of the shaft 113 and exhibit a breakthrough 133 in this area that extends parallel to the longitudinal axis of the shaft 113, which is partially reached through for stabilization of a stabilization section 134 of the clamping element 23.

As regards the arrangement of the contact surfaces, the lay-out of the contact surfaces, the connection of clamping elements and clip, arrangement of the retainer in relation to the spring and arrangement of the spring of the clamping element in relation to the clip surface are interchangeable and combinable between the two embodiments that are represented in the Figures, without there resulting in any limitations as regards the functionality.

The invention claimed is:

1. A device for holding a component, whereby the device comprises a clip, whereby the clip comprises a head and at least one clip surface for lying on the component to be held or an element, on which the component is to be held, whereby the clip surface is facing the head and is spaced apart from the head, the device further comprising a clamping element, that supports the head from a side of the head that is facing the clip surface or that is connected with the head, whereby the clamping element exhibits a contact surface, which is facing the clip surface, and furthermore the device comprises a spring, which is arranged in such a way so as to pre-tension the contact surface in a direction away from the clip surface, the clamping device further comprises a detachable retainer, which holds the head in a first position in relation to the contact surface, whereby the spring is deformed in a direction, in which the pre-tension is increased when the head is in this first position in comparison to a second position which can capture the head in relation to the contact surface.

2. The device according to claim 1, wherein the head is movable in relation to the contact surface by means of a deformation of the spring in a direction in which the pre-tension is increased.

3. The device according to claim 1, wherein the retainer exhibits a protrusion, which is movable from a contact position, in which it contacts the head and holds the head in the first position, to a release position, in which it no longer holds the head.

4. The device according to claim 1, wherein the clip has a shaft, and the head is connected with the shaft, and that the shaft features a leading edge, whereby the clip surface is a surface on the leading edge.

5. The device according to claim 1, wherein the clamping element exhibits two springs that are spaced apart from one another, which are arranged in such a way so as to pre-tension the contact surface away in the direction of the clip surface.

6. The device according to claim 1, wherein the clip is detachably attached to the clamping element.

7. The device according to claim 1, wherein more than one contact surface is foreseen, that is essentially symmetrically arranged in relation to a portion of the clip.

8. The device according to claim 1, wherein four contact surfaces are provided.

9. The device according to claim 1, wherein the clip is formed in one piece out of a metal sheet, whereby sections of the metal sheet are bent relative to one another, so as to give the clip its three-dimensional shape, and/or so that the clamping element is formed in one piece out of a metal sheet, whereby sections of the metal sheet are bent relative to one another, so as to give the clamping element its three-dimensional shape.

10. The device according to claim 9, wherein the clamping element is formed in one piece out of a metal sheet, whereby sections of the metal sheet are bent relative to one another, to give the clamping element its three-dimensional shape, and that the retainer comprises an upwards bent part of a metal sheet, that protrudes beyond the head of the clip, whereby the upwards bent portion of the metal sheet exhibits a protrusion that is bent inwards, which contacts the head and holds the head in a first position.

11. A device for holding a component, whereby the device comprises a clip, whereby the clip comprises a head and at least one clip surface for lying on the component to be held or an element on which the component is to be held, whereby the clip surface is facing the head and is spaced apart from the head, the device further comprising a clamping element, that supports the head from a side of the head that is facing the clip surface or that is connected with the head, whereby the clamping element exhibits a contact surface, which is facing the clip surface, and furthermore the device comprises a spring, which is arranged in such a way so as to pre-tension the contact surface in a direction away from the clip surface, said head being movable in relation to the contact surface by means of a deformation of the spring in a direction in which the pre-tension is increased, the clamping device further comprises a detachable retainer, which holds the head in a first position in relation to the contact surface, whereby the spring is deformed in a direction, in which the pre-tension is increased when the head is in this first position in comparison to a second position which can capture the head in relation to the contact surface.

12. The device according to claim 11, wherein the retainer exhibits a protrusion, which is movable from a contact position, in which it contacts the head and holds the head in the first position, to a release position, in which it no longer holds the head.

13. The device according to claim 11, wherein the clip has a shaft, and the head is connected with the shaft, and that the shaft features a leading edge, whereby the clip surface is a surface on the leading edge.

14. A device for holding a component, whereby the device comprises a clip, whereby the clip comprises a head and at least one clip surface for lying on the component to be held or an element on which the component is to be held, whereby the clip surface is facing the head and is spaced apart from the head, the device further comprising a clamping element, that supports the head from a side of the head that is facing the clip surface or that is connected with the head, whereby the clamping element exhibits a contact surface, which is facing the clip surface, and furthermore the device comprises a spring, which is arranged in such a way so as to pre-tension the contact surface in a direction away from the clip surface, said clip being detachably attached to said clamping element, the clamping device further comprises a detachable retainer, which holds the head in a first position in relation to the contact surface, whereby the spring is deformed in a direction, in which the pre-tension is increased when the head is in this first position in comparison to a second position which can capture the head in relation to the contact surface.

15. The device according to claim 14, wherein more than one contact surface is foreseen, that is essentially symmetrically arranged in relation to a portion of the clip.

16. The device according to claim 14, wherein four contact surfaces are provided.

17. The device according to claim 14, wherein the clip is formed in one piece out of a metal sheet, whereby sections of the metal sheet are bent relative to one another, so as to give the clip its three-dimensional shape, and/or so that the clamping element is formed in one piece out of a metal sheet, whereby sections of the metal sheet are bent relative to one another, so as to give the clamping element its three-dimensional shape.

18. The device according to claim 14, wherein the clamping element is formed in one piece out of a metal sheet, whereby sections of the metal sheet are bent relative to one another, to give the clamping element its three-dimensional shape, and that the retainer comprises an upwards bent part of a metal sheet, that protrudes beyond the head of the clip, whereby the upwards bent portion of the metal sheet exhibits a protrusion that is bent inwards, which contacts the head and holds the head in a first position.

* * * * *